2,769,794

Patented Nov. 6, 1956

2,769,794

WATER VAPOR IMPERVIOUS SYNTHETIC RESIN COMPOSITION

Myron A. Coler, New York, N. Y., and Herbert A. Gottschall, Clifton, N. J., assignors to Myron A. Coler, New York, N. Y.

No Drawing. Application March 4, 1953, Serial No. 340,394

6 Claims. (Cl. 260—41)

This invention relates to an improved plastic composition and in particular to a composition having low water vapor permeability.

In certain applications for plastics, such as containers or casings for batteries, it is essential that the water vapor permeability of the container material be low otherwise the battery system would lose water during storage under normally dry atmospheric conditions resulting in poor shelf life. Shelf life of a battery is important, and particularly so in military applications wherein a battery may be in storage for many years before actually being placed in service. More generally stated, it is often desired that the permeability of plastics to water vapor and to other gases and vapors be reduced to a minimum.

It is an object of this invention to provide a plastic composition having low vapor permeability.

It is a further object of this invention to provide a low cost plastic having preferred vapor permeability characteristics.

A particular object is to provide polystyrene based plastic compositions having low water vapor permeability while retaining the desirable physical properties of the parent plastic such as mechanical strength and adaptability to heat sealing.

Other objects and advantages will more fully appear during the course and progress of the following specification.

It has been discovered that by incorporating into a base plastic a finely divided material capable of reacting with water in such fashion that the volume of the reaction products exceeds the volume of the added material, a blocking effect on the passage of water vapor is obtained.

It is thought that this blocking effect is due to reaction between water vapor which would otherwise diffuse through the plastic and the added material with resulting swelling of the added material and blocking of the pores through which diffusion might otherwise take place. Alternatively adsorption sites within the plastic may be blocked. The actual mechanism is not clear, however, and no commitment is made as to the accuracy of the above postulated mechanism. Suffice it to say that the blocking action takes place without direct physical contact of the molded plastic with water.

It has been found that plastics of the type described herein, after being exposed to a humid atmosphere or to conditions under which water vapor would tend to diffuse through the plastic, become relatively impervious to the passage of other gases and vapors.

The materials which function properly for the purposes of this invention are those which form relatively stable combinations which can not be broken down at ordinary atmospheric temperatures. Materials forming only moderately stable hydrates, such as cupric sulfate, are not useful.

This invention is clearly disclosed by the following specific examples:

Example 1

95 grams of an acrylonitrile modified polystyrene molding compound ground to pass an 80 mesh screen and be retained on a 140 mesh screen were thoroughly mixed with 5 grams of commercial plaster of Paris made under the trademark "Red Top" by U. S. Gypsum Company.

The resulting composition was molded in the form of a disc 2½ inches in diameter and about 0.040 inch thick. When tested for water vapor transmission a reduction of approximately 40% over the transmission of water vapor by a similarly molded control sample of polystyrene which did not contain the plaster of Paris. The sample was tested for permeability by the well known cup test method described, for instance in "Elastomers and Plastomers," R. Houwink, vol. I, p. 321, Elsevier Publishing Co., New York, 1950.

Example 2

95 grams of polystyrene molding compound ground to pass an 80 mesh screen and be retained on a 140 mesh screen were mixed by tumbling for 10 hours with 5 grams of Portland cement all particles of which were finer than 200 mesh. The resulting mixture was molded under a force of 15,000 pounds at 310° F. for 20 minutes into a disc 2½ inches in diameter and about 0.040 inch thick.

When tested against an unmodified polystyrene control sample a 35% reduction of water vapor transmission was noted for the treated sample.

Example 3

The experiment of Example 1 was repeated except that 97 grams of polystyrene and 3 grams of plaster of Paris were used. A disc molded from this composition showed a 35% reduction in water vapor transmission over a control sample prepared from untreated polystyrene.

Example 4

95 grams of polymethylmethacrylate ground to pass an 80 mesh screen and be retained on a 200 mesh screen were thoroughly mixed with 5 grams of the plaster of Paris used in Example 1.

The resulting composition was molded under the conditions given in Example 2. The molding, when subjected to the cup test, showed a water vapor transmission 25% less than that of a similar molding made from untreated polymethylmethacrylate.

It has been determined experimentally that dry cells made with casings of the plastic of this invention definitely show less weight loss and longer shelf life when stored at 130° F. than cells with cases made of the corresponding untreated plastic.

In order to secure the advantages described in this invention the water-swellable agent must be present to the extent of at least 1% by weight of the plastic composition. When 20% or more of water-swellable agent is used a weakening of the plastic composition is observable. If more than 45% of water-swellable agent is used the physical properties of the composition are objectionably impaired.

The term plastic as used herein is intended to embrace any of a large and varied group of materials which consists of or contains as an essential ingredient an organic (including silicon organic) substance of large molecular weight and which while solid in the finished state, at some stage in its manufacture has been or can be formed into various shapes by flow, usually through the application singly or together of heat and pressure.

Many plastics could be used advantageously in carrying out this invention including polystyrene and its modified forms, polyethylene and polymethylmethacrylate and phenol formaldehyde resin.

In general the modifying material should react with water in a reaction which is irreversible at the use temperatures of the plastic in question resulting in swelling.

The material should not be a solvent for or soluble in or reactive with the base plastic.

It is thought that the invention and its attendant advantages will be understood from the foregoing description and it is obvious that numerous changes may be made in the product without departing from the spirit or scope of the invention, or sacrificing any of its attendant advantages, the best forms currently known are described herein for the purpose of illustrating the invention, the formulation of Example 1 being currently preferred.

Having thus described our invention, what we claim as new and desire to secure by Letters Patent is as follows:

1. A composition comprising a resinous synthetic material selected from the group consisting of polyethylene, polymethyl-methacrylate and polystyrene and between 1% and 20% by weight of an agent selected from the group consisting of plaster of Paris and Portland cement.

2. The composition of claim 1 wherein said resinous synthetic material is a polystyrene and said agent is plaster of Paris.

3. The composition of claim 1 wherein said resinous synthetic material is a polystyrene and said agent is Portland cement.

4. A molded article comprising a resinous synthetic material selected from the group consisting of polyethylene, polymethyl-methacrylate and polystyrene and between 1% and 20% by weight of an agent selected from the group consisting of plaster of Paris and Portland cement.

5. The molded article of claim 4 wherein said resinous synthetic material is a polystyrene and said agent is plaster of Paris.

6. The molded article of claim 4 wherein said resinous synthetic material is a polystyrene and said agent is Portland cement.

References Cited in the file of this patent

UNITED STATES PATENTS

| | | |
|---|---|---|
| 2,199,557 | Charlton | May 7, 1940 |
| 2,218,710 | Herrmann et al. | Oct. 22, 1940 |
| 2,305,804 | Bertz et al. | Dec. 22, 1942 |
| 2,419,440 | Del Monte | Apr. 22, 1947 |
| 2,571,343 | Dailey et al. | Oct. 16, 1951 |
| 2,630,425 | Rodman | May 3, 1953 |

FOREIGN PATENTS

| | | |
|---|---|---|
| 345,197 | Great Britain | Mar. 9, 1951 |